(12) United States Patent  (10) Patent No.: US 8,014,088 B2
Aoki et al.  (45) Date of Patent: Sep. 6, 2011

(54) LENS GROUP POSITIONING METHOD AND IMAGE CAPTURING APPARATUS

(75) Inventors: Yosuke Aoki, Hachioji (JP); Isao Ishimoda, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 253 days.

(21) Appl. No.: 12/405,914

(22) Filed: Mar. 17, 2009

(65) Prior Publication Data

US 2009/0244730 A1 Oct. 1, 2009

(30) Foreign Application Priority Data

Mar. 27, 2008 (JP) ................................. 2008-083148

(51) Int. Cl.
G02B 7/02 (2006.01)
G02B 15/14 (2006.01)
(52) U.S. Cl. .................... 359/823; 359/819; 359/697
(58) Field of Classification Search ................... 359/696, 359/697, 819–823
See application file for complete search history.

(56) References Cited

U.S. PATENT DOCUMENTS

| 7,102,270 | B2 * | 9/2006 | Ito et al. | 310/317 |
| 2009/0097130 | A1 * | 4/2009 | Mihara | 359/680 |
| 2009/0284845 | A1 * | 11/2009 | Sugiura | 359/697 |

FOREIGN PATENT DOCUMENTS

JP 2007-017846 1/2007

* cited by examiner

*Primary Examiner* — Mohammed Hasan
(74) *Attorney, Agent, or Firm* — Cozen O'Connor

(57) ABSTRACT

Described is an image capturing apparatus, which makes it possible to accurately secure the distance between the two lens groups, even if the interval distance between the two lens groups varies from the default design-distance value. The image capturing apparatus includes a first lens group, a second lens group, a first driving section to drive the first lens group, a second driving section to drive the second lens group, a first detecting section to detect a first reference position for moving the first lens group, and a second detecting section to detect a second reference position for moving the second lens group. A control section controls either the first driving section or the second driving section so as to move a corresponding one of the first lens group and the second lens group between the first detecting section and the second detecting section at a predetermined timing.

6 Claims, 10 Drawing Sheets

LENS GROUP POSITIONING METHOD AND IMAGE CAPTURING APPARATUS

This application is based on Japanese Patent Application No. 2008-083148 filed on Mar. 27, 2008, with Japan Patent Office, the entire content of which is hereby incorporated by reference.

BACKGROUND OF THE INVENTION

The present invention relates to a lens group positioning method for determining a relative relationship between positions of a plurality of lens groups and an image capturing apparatus.

Generally speaking, in a lens unit to be employed for an image capturing optical system provided in a conventional image capturing apparatus, such as a camera, etc., the optical system is constituted by a plurality of lens groups, so as to perform a zooming operation and a focusing operation by driving each of the plurality of lens groups independently from each other.

The image capturing apparatus, in which each of the plurality of lens groups is driven independently from each other so as to perform the zooming operation and the focusing operation, is so constituted that a reference position of each of the plurality of lens groups is detected, and then, the position of each of the plurality of lens groups is controlled by controlling a number of steps for driving a stepping motor from the corresponding reference position detected.

The abovementioned reference position has been detected in such a manner that a light shading plate, integrally mounted on each of the plurality of lens groups, is inserted or withdrawn into/from a gap formed between a light emitting and receiving parts of a photo-interrupter, so as to detect either a position at which a detected signal changes from a light shading state caused by the insertion of the light shading plate to a light receiving state caused by the withdrawal of the light shading plate, or another position at which the detected signal changes from the light receiving state caused by the withdrawal of the light shading plate to the light shading state caused by the insertion of the light shading plate.

Such the lens unit that employs the photo-interrupter to detect the reference position of each of the plurality of lens groups as abovementioned is well-known in this technical field, and for instance, Tokkai 2007-17846 (Japanese Non-Examined Patent Publication) sets forth an example of the above.

In recent years, associating with the size minimization of the lens unit and the trend for pursuing a high variable power capability, sometimes, it has become impossible to secure a desired performance, unless a gap distance between specific lens groups disposed in the vicinity of the image surface (focal plane) is accurately secured specifically.

To accurately secure the gap distance between the lens groups, there has arisen a problem that an assembling error of the photo-interrupter, which is disposed so as to detect the reference position of each of the plurality of lens groups, namely, an error of the reference position, is directly reflected on the error of the gap distance between the lens groups as it is. However, it has been difficult to solve the abovementioned problem, since it is quite difficult to mount two photo-interrupters onto the lens unit while accurately determining the distance between light emitting and receiving parts of the two photo-interrupters at a predetermined value.

SUMMARY OF THE INVENTION

To overcome the abovementioned drawbacks in conventional image capturing apparatus, it is one of objects of the present invention to provide a lens-group positioning method and an image capturing apparatus, each of which makes it possible to accurately secure the distance between the two lens groups, the reference positions of which are detected by the two photo interrupters, so as to produce a high quality image, even if the interval distance between the two photo interrupters varies from the default design-distance value.

Accordingly, at least one of the objects of the present invention can be attained by the lens-group positioning method and the image capturing apparatus described as follows.

(1) According to a lens-group positioning method reflecting an aspect of the present invention, the lens-group positioning method to be employed for positioning a first lens group and a second lens group, both of which are included in an optical system that further includes a first detecting section to detect a first reference position for moving the first lens group, and a second detecting section to detect a second reference position for moving the second lens group, comprises: moving any one of the first lens group and the second lens group, so as to find a real distance between the first detecting section and the second detecting section; finding a differential value between the real distance and a default design-distance between the first detecting section and the second detecting section; positioning the first lens group based on a first detected result, which is detected by the first detecting section; and positioning the second lens group based on the differential value and a second detected result, which is detected by the second detecting section.

(2) According to another aspect of the present invention, in the lens-group positioning method recited in item 1, the first lens group and the second lens group are arranged in the optical system in such a manner that the first lens group and the second lens group are respectively movable in a direction of a common optical axis.

(3) According to still another aspect of the present invention, in the lens-group positioning method recited in item 2, the optical system is a bended optical system in which the common optical axis is bended at substantially a right angle.

(4) According to an image capturing apparatus reflecting still another aspect of the present invention, the image capturing apparatus comprises: a lens unit that includes a first lens group, a second lens group, a first driving section to drive the first lens group, a second driving section to drive the second lens group, a first detecting section to detect a first reference position for moving the first lens group, and a second detecting section to detect a second reference position for moving the second lens group; and a control section to control the first driving section and the second driving section so as to move the first lens group and the second lens group, respectively; wherein the control section controls either the first driving section or the second driving section so as to move a corresponding one of the first lens group and the second lens group between the first detecting section and the second detecting section at a predetermined timing.

(5) According to still another aspect of the present invention, in the image capturing apparatus recited in item 4, after the corresponding one of the first lens group and the second lens group is made to move between the first detecting section and the second detecting section, the control section controls the first driving section and the second driving section so as to move the first lens group and the second lens group based on the first reference position detected by the first detecting section, and the second reference position detected by the second detecting section, respectively.

(6) According to still another aspect of the present invention, in the image capturing apparatus recited in item 4, the first lens group and the second lens group are mounted inside the lens unit in such a manner that the first lens group and the second lens group are respectively movable in a direction of a common optical axis.

(7) According to yet another aspect of the present invention, in the image capturing apparatus recited in item 6, a bended optical system, which includes the first lens group and the second lens group and in which the common optical axis is bended at substantially a right angle, is installed in the lens unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3(a) shows a cross sectional schematic diagram indicating a bended image-capturing optical system having a capability of variable power and included in a lens unit embodied in the present invention, while, FIG. 3(b) shows a graph indicating moving line charts, each of which corresponds to a movement of each of lens groups included in the lens unit, at the time of a zooming operation;

DETAILED DESCRIPTION OF THE PREFERRED EMBODIMENT

Figure 1:
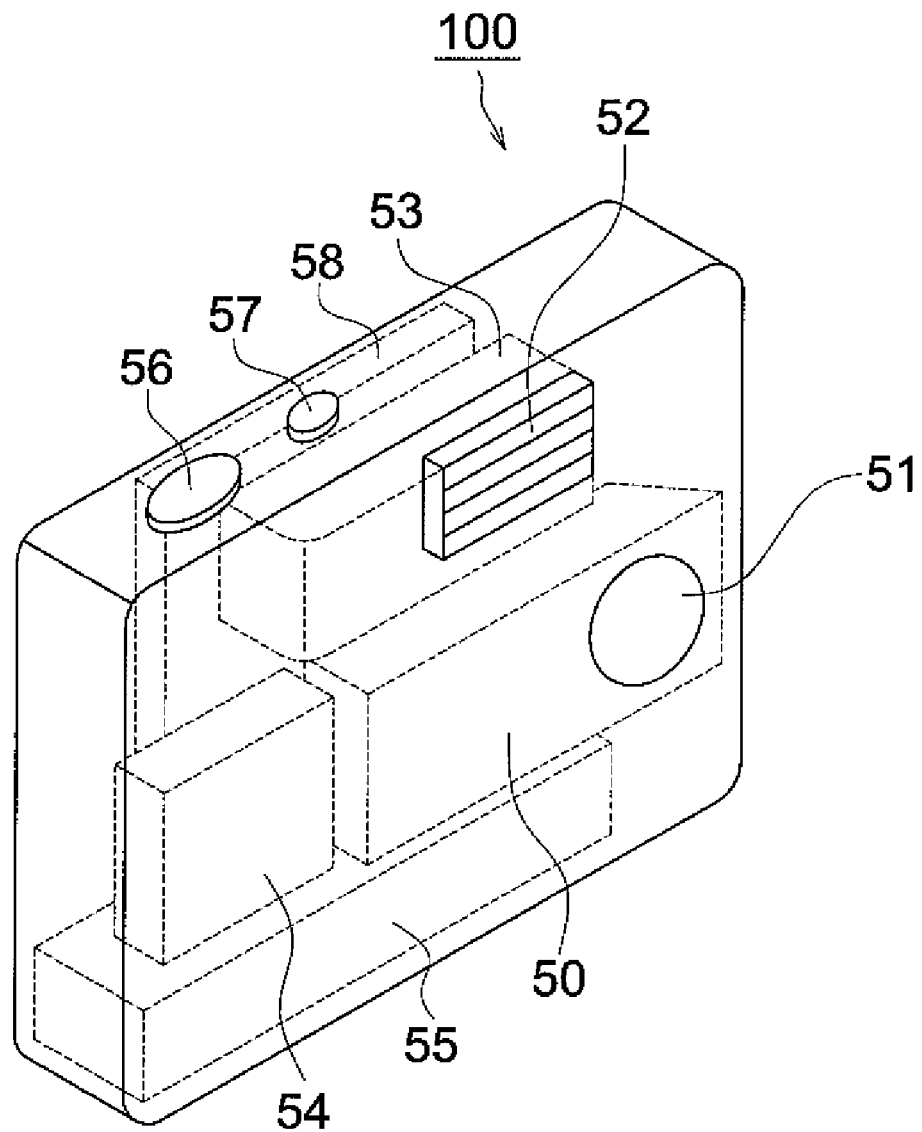
FIG. 1 shows a schematic diagram indicating an exemplary internal arrangement of main constituent units provided in an example of image capturing apparatus provided with a lens unit embodied in the present invention.

Referring to the drawings, a preferred embodiment of the present invention will be detailed in the following. However, the scope of the present invention is not limited to the embodiment to be described in the following.

FIG. 1 shows a schematic diagram indicating an exemplary internal arrangement of main constituent units provided in an camera 100, which is an example of image capturing apparatus provided with a lens unit 50 embodied in the present invention. The schematic diagram shown in FIG. 1 is a perspective view drawn as through looking from the subject side.

As shown in FIG. 1, in the camera 100, the lens unit 50, which includes a bended image capturing optical system having a capability of variable power, is arranged along the front surface of the camera 100 as indicated in the schematic diagram, and an aperture section 51 is arranged such a position that takes the light bundle coming from the subject into the lens unit 50. Further, a lens barrier (not shown in the drawings) to open and close the aperture section 51 is disposed in front of the aperture section 51.

Numeral 52 indicates a flash light emitting window, while numeral 53 indicates a flash unit constituted by a reflector, a xenon tube, a capacitor, a circuit board, etc., and disposed at the rear side of the flash light emitting window 52. Numeral 54 indicates a card-type image data storage for recording image data therein. Numeral 55 indicates a buttery serving as a power source to supply electric power to various kinds of sections of the camera 100. The card-type image data storage 54 and the buttery 55 are detachable from a cover section (not shown in the drawings).

A release button 56 is disposed on the upper surface of the camera 100, so that an initial stage of its depression (hereinafter, referred to as an ON status of switch S1) activates the actions for preparing the image capturing operation, namely, the focusing action, the photometry action, etc., and then, a secondary stage of its depression (hereinafter, referred to as an ON status of switch S2) activates the image capturing operation including the image capturing and exposure actions. Numeral 57 indicates a main switch to change the status of the camera 100 between the operating status and the non-operating status. When the camera 100 is turned to the operating status by operating the main switch 57, all of the sections included in the camera 100 are activated by opening the lens barrier, if the camera 100 is provided with the lens barrier. Conversely, when the camera 100 is turned to the non-operating status by operating the main switch 57, the lens barrier is closed, and at the same time, all of the sections included in the camera 100 are deactivated.

Further, an image display section 58, which is constituted by display elements, such as a LCD (Liquid Crystal Display), an Organic EL (Electric Luminescence), etc., so as to display various kinds of images, character information, etc., thereon, is mounted on the rear surface of the camera 100.

Still further, various kinds of operating parts, such as a zooming button for conducting the zooming up and the zooming down operations, a playback button for reproducing the captured images, a menu button for displaying various kinds of menu on the image display section 58, a selecting button for selecting a desired function from those displayed on the screen, etc., are arranged on the rear surface of the camera 100, though those are not shown in the drawings. Yet further, the camera 100 is also provided with an external input output terminal and an strap attaching section, which are disposed on the side surface of the camera 100, and a tripod socket hole, etc., which are disposed on the bottom surface of the camera 100, though those are not shown in the drawings.

In this connection, a circuit board (such as a flexible printed circuit board, etc.), on which various kinds of electric parts are mounted, is disposed in the camera 100, in such a manner that the abovementioned main constituent units are electrically coupled to each other through the circuit board, so as to conduct driving and controlling operations of the main constituent units.

Figure 2:
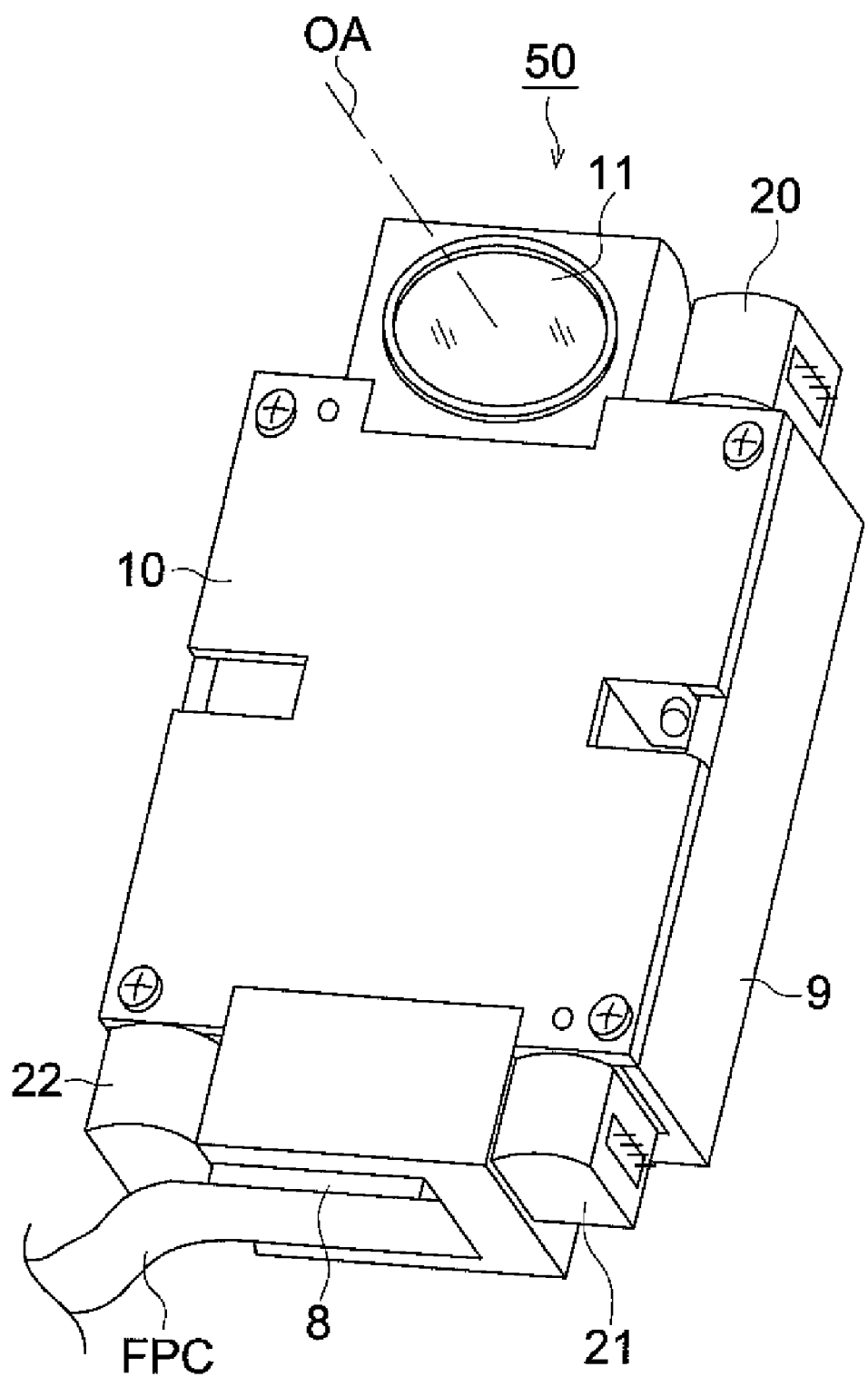
FIG. 2 shows a schematic diagram indicating a perspective view of an outer appearance of a lens unit embodied in the present invention.

FIG. 2 shows a schematic diagram indicating a perspective view of an outer appearance of the lens unit 50 embodied in the present invention. In this connection, to avoid overlapping explanation for the same element, hereinafter, the present embodiment will be detailed in the following by attaching the same reference number to the same functional element.

As shown in FIG. 2, the outer appearance of the lens unit 50 is shaped in substantially a rectangular solid, and a main barrel 9 is provided with a plurality of lens groups (not shown in FIG. 2) arranged inside the main barrel 9, a first motor 20, a second motor 21 and a third motor 22, each of which moves a corresponding one of three lens groups among the plurality of lens groups, independently from the other lens groups. Numeral 8 indicates an image capturing element, which is coupled to the printed circuit board (not shown in the drawings) through an FPC (Flexible Printed Circuit). Numeral 11 indicates a lens disposed at a position nearest to the objective subject side in such a manner that an optical axis OA of the lens 11 is directed to the subject concerned.

For instance, the first motor 20, the second motor 21 and the third motor 22 are stepping motors, and are coupled to the printed circuit board (not shown in the drawings) in such a manner that those are controlled and driven independently from each other.

Figure 3:
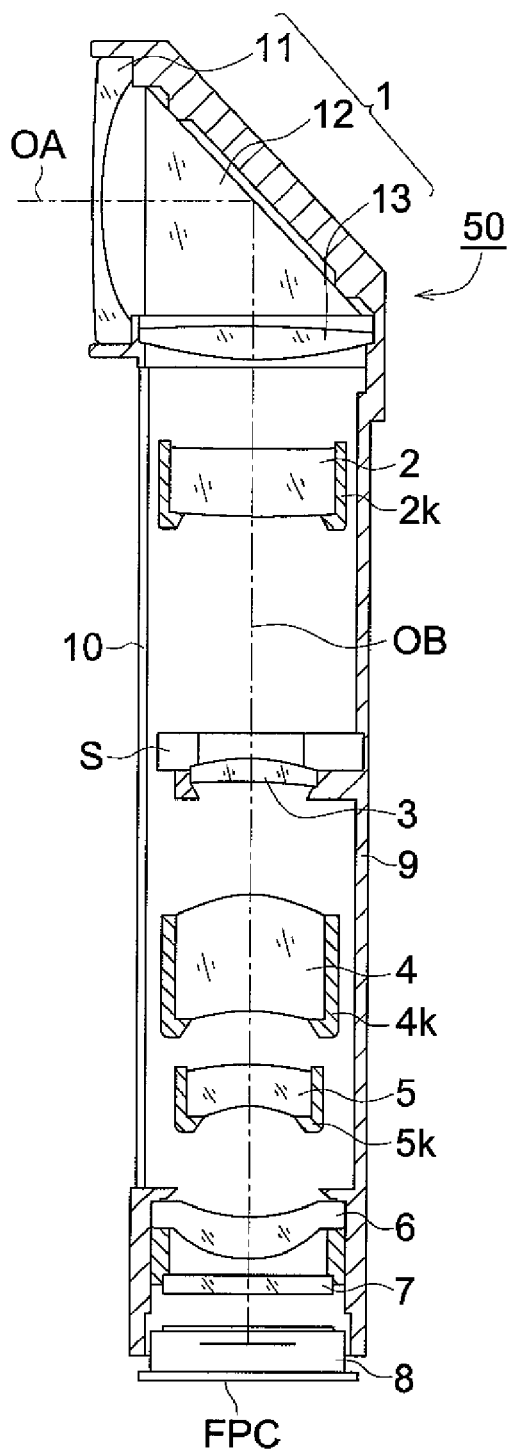
Figure 3:
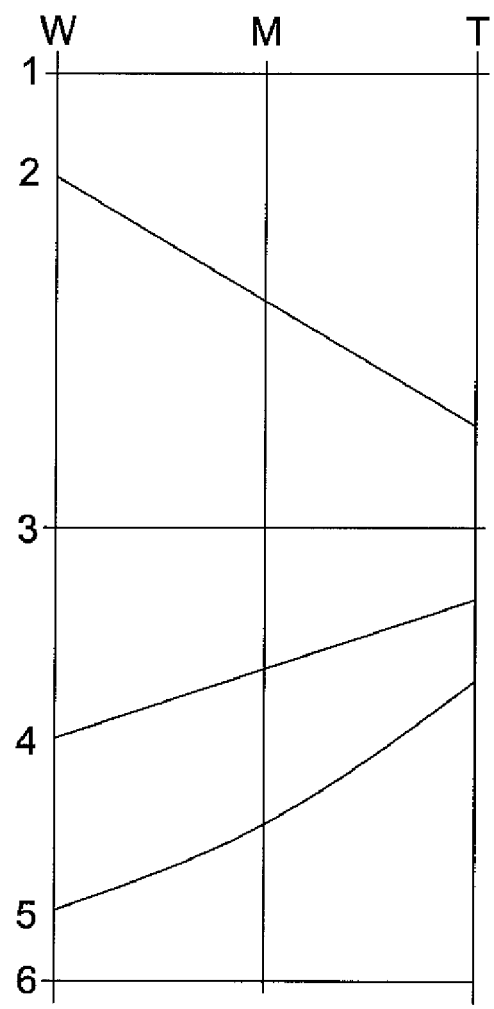

FIG. 3(a) shows a cross sectional schematic diagram indicating a bended image-capturing optical system having a capability of variable power and included in the lens unit 50 embodied in the present invention. The cross sectional schematic diagram shown in FIG. 3(a) is acquired by cutting the lens unit 50 with a plane including two optical axes OA and OB, each serving as the optical axis before and after bending. Further, FIG. 3(b) shows a graph indicating moving line charts, each of which corresponds to a movement of each of the lens groups, included in the lens unit 50, at the time of the zooming operation.

As shown in FIG. 3(a), symbol OA denotes an optical axis before the optical axis is bended, while symbol OB denotes another optical axis after the optical axis is bended. Numeral 1 indicates a first lens group, which is constituted by: the lens 11 that has the optical axis OA and is directed to the subject concerned; a prism 12 that is a reflecting element to bend the optical axis OA in a direction substantially orthogonal to the optical axis OA; and a lens 13 that is arranged along the optical axis OB bended by the prism 12. The first lens group I is fixed onto the main barrel 9.

Further, numeral 2 indicates a second lens group, which is held by a second lens-group holding frame 2k. The second lens group 2 moves integrally with the second lens-group holding frame 2k at the time of conducting the variable power operation (hereinafter, also referred to as a zooming operation).

Still further, numeral 3 indicates a third lens group, which is fixed onto the main barrel 9. The third lens group 3 is an immovable lens group.

Still further, numeral 4 indicates a fourth lens group, which is held by a fourth lens-group holding frame 4k. The fourth lens group 4 moves integrally with the fourth lens-group holding frame 4k at the time of conducting the variable power operation.

Still further, numeral 5 indicates a fifth lens group, which is held by a fifth lens-group holding frame 5k. The fifth lens group 5 moves integrally with the fifth lens-group holding frame 5k at the time of conducting the variable power operation.

Still further, numeral 6 indicates a sixth lens group, which is fixed onto the main barrel 9. The sixth lens group 6 is an immovable lens group.

Yet further, numeral 7 indicates an optical filter, which is made by laminating an infrared filter and an optical tow-pass filter with each other, and is fixed onto the main barrel 9. Numeral 8 indicates an image capturing element for which a CCD (Charge Coupled Device) type image sensor, a CMOS (Complementary Metal-Oxide Semiconductor) type image sensor, etc., is employed. The image capturing element 8 is fixed onto the main barrel 9. Symbol FPC denotes a flexible printed circuit, one end of which is coupled to the image sensor 8, and another one of which is coupled to another circuit provided in the camera 100. Symbol S denotes a shutter unit, which is fixed onto the main barrel 9.

As shown in FIG. 3(b), the first lens group 1, the third lens group 3 and the sixth lens group 6 are immovable lens groups, while the second lens group 2, the fourth lens group 4 and the fifth lens group 5 move between a Wide position (W), a Middle position (M) and a Tele position (T) according to the moving line charts indicated in the graph, respectively, so as to achieve the zooming operation. In this connection, the fifth lens group 5 further moves from the position set for the zooming operation, so as to perform the focusing operation.

Figure 4:
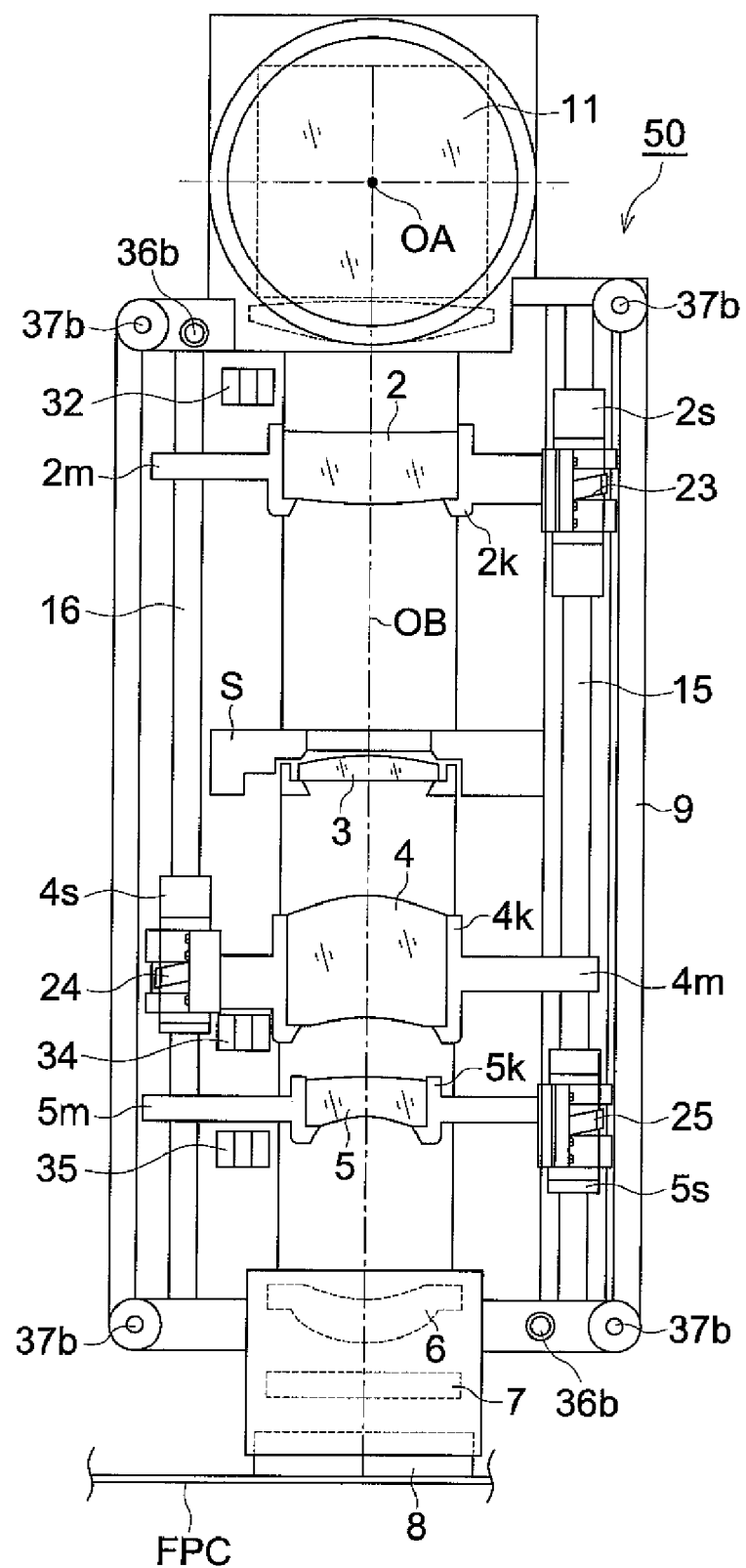
FIG. 4 shows a plane view roughly indicating an internal structure of a lens unit embodied in the present invention, at the time when the zooming position is set at the Wide position (W)

FIG. 4 shows a plane view roughly indicating an internal structure of the lens unit 50 embodied in the present invention, at the time when the zooming position is set at the Wide position (W). In the plane view shown in FIG. 4, the first motor 20, the second motor 21, the third motor 22, and a cover element 10 are excluded from the outer appearance of the lens unit 50 shown in FIG. 2.

As shown in FIG. 4, a sleeve 2s that is integrally formed on the second lens-group holding frame 2k, a sleeve 5s that is integrally formed on the fifth lens-group holding frame 5k, a rotation locking part 4m that is integrally formed on the fourth lens-group holding frame 4k, and a guiding shaft 15 that penetrates through the rotation locking part 4m, are assembled in the lens unit 50. Further, a rotation locking part 2m that is integrally formed on the second lens-group holding frame 2k, a sleeve 4s that is integrally formed on the fourth lens-group holding frame 4k, a rotation locking part 5m that is integrally formed on the fifth lens-group holding frame 5k, and a guiding shaft 16 that penetrates through the rotation locking part 5m, are also assembled in the lens unit 50. According to the abovementioned structure, the second lens-group holding frame 2k, the fourth lens-group holding frame 4k and the fifth lens-group holding frame 5k are made to be movable in the direction of the optical axis OB along the guiding shaft 15 and the guiding shaft 16. In this connection, each of the sleeves is fitted through the guiding shaft, while both end portions of each of the guiding shaft 15 and the guiding shaft 16 are fixed onto the main barrel 9 by using adhesive etc., so as to dispose them substantially in parallel to the optical axis OB.

Fitting members 23, 24, 25, each of which is driven by the rotation of a lead screw integrally formed on the corresponding motor, so as to move them in the direction of the optical axis OB along the guiding shafts 15 and 16, are assembled onto the sleeve 2s, the sleeve 4s and the sleeve 5s. Further, numerals 32, 34 and 35 indicate photo-interrupters.

The photo-interrupter 32 serves as a detector to detect a reference position for positioning the second lens-group holding frame 2k by detecting a turnover position caused by the light shading plate formed on the second lens-group holding frame 2k. Further, the photo-interrupter 34 serves as another detector to detect another reference position for positioning the fourth lens-group holding frame 4k by detecting a turnover position caused by the light shading plate formed on the fourth lens-group holding frame 4k. Still further, the photo-interrupter 34 serves as still another detector to detect still another reference position for positioning the fifth lens-group holding frame 5k by detecting a turnover position caused by the light shading plate formed on the fifth lens-group holding frame 5k.

Figure 5:
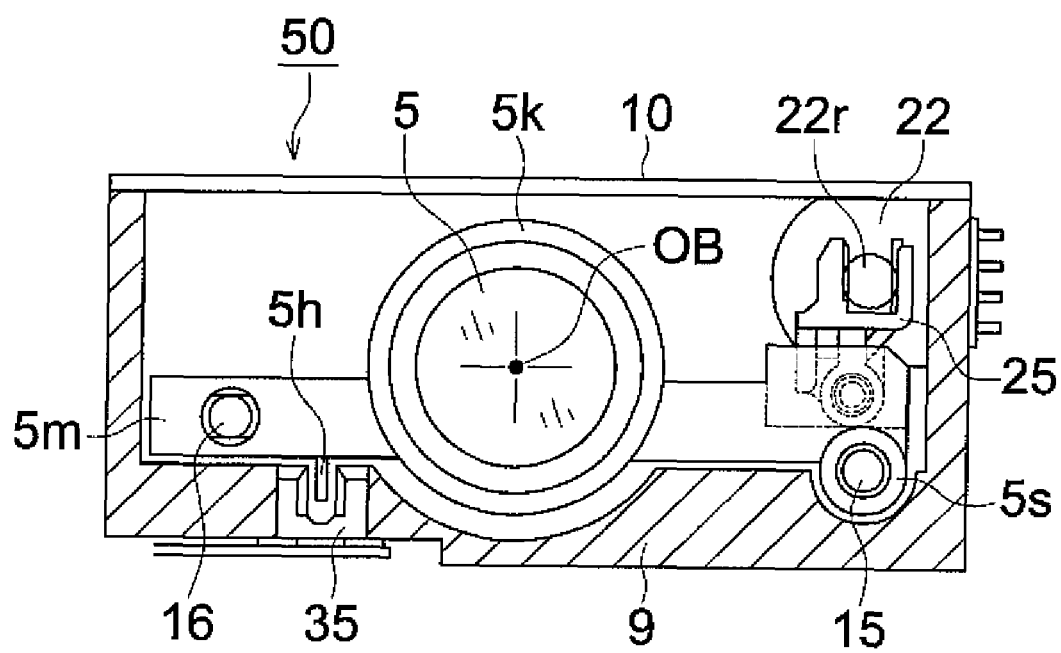
FIG. 5 shows a schematic diagram indicating a positional relationship between a photo-interrupter and a light shading plate.

FIG. 5 shows a schematic diagram indicating the positional relationship between the photo-interrupter and the light shading plate. In the schematic diagram shown in FIG. 5, the fifth lens-group holding frame 5k is viewed form the image surface (focal plane).

As shown in FIG. 5, the sleeve 5s and the rotation locking part 5m are integrally formed on the fifth lens-group holding frame 5k, respectively. Further, the guiding shaft 15 is fitted through the sleeve 5s, while the guiding shaft 16 is penetrated through the rotation locking part 5m, so as to make the fifth lens-group holding frame 5k movable in the direction of the optical axis OB. Still further, the fitting member 25 is assembled on the sleeve 5s, which is geared with a lead screw 22r of the third motor 22. In the above mechanical structure, the fitting member 25 is made to move along the lead screw 22r by rotating the lead screw 22r, and accordingly, the fifth lens-group holding frame 5k moves in the direction of the optical axis OB.

In addition to the above, a light shading plate 5h is integrally formed on the fifth lens-group holding frame 5k, in such a manner that the light shading plate 5h can pass through a gap formed between a light emitting and receiving parts of a photo-interrupter 35. The mechanical structures of the second lens-group holding frame 2k and the fourth lens-group holding frame 4k are substantially the same as that of the fifth lens-group holding frame 5k.

In this connection, the positional relationship between the fourth lens-group holding frame 4k and the fifth lens-group holding frame 5k in the present embodiment is so constituted that a light shading plate 4h formed on the fourth lens-group holding frame 4k can also pass through the gap formed between the light emitting and receiving parts of the photo-interrupter 35, for detecting the light shading plate 5h formed on the fifth lens-group holding frame 5k.

According to the abovementioned structure, a photo-interrupter 34 detects a reference position for positioning the fourth lens-group holding frame 4k, by detecting a turnover position between the insertion and the withdrawal of the light shading plate 4h formed on the fourth lens-group holding frame 4k. Further, a photo-interrupter 35 detects another reference position for positioning the fifth lens-group holding frame 5k, by detecting another turnover position between the insertion and the withdrawal of the light shading plate 5h formed on the fifth lens-group holding frame 5k.

Further, by moving the light shading plate 4h, formed on the fourth lens-group holding frame 4k, from the gap formed between the light emitting and receiving parts of the photo-interrupter 34, to the other gap formed between the light emitting and receiving parts of the photo-interrupter 35, it becomes possible to detect a distance between the gap, formed between the light emitting and receiving parts of the photo-interrupter 34, and the other gap, formed between the light emitting and receiving parts of the photo-interrupter 35.

The essential operations to be conducted by the image capturing apparatus, provided with the lens unit 50 structured as abovementioned, will be detailed in the following.

Figure 6:
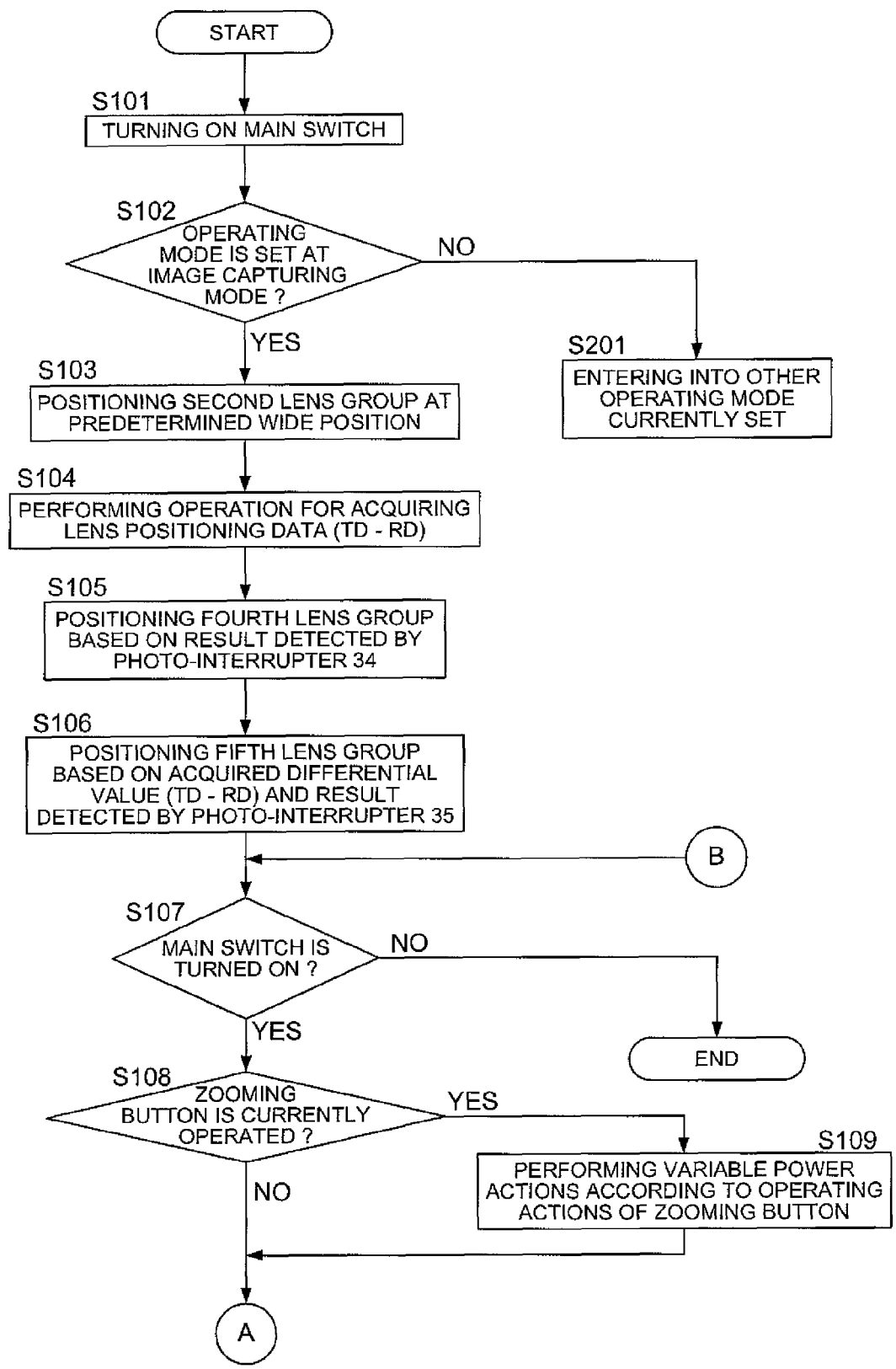
FIG. 6 shows a flowchart indicating essential operations to be conducted by an image capturing apparatus embodied in the present invention.
Figure 7:
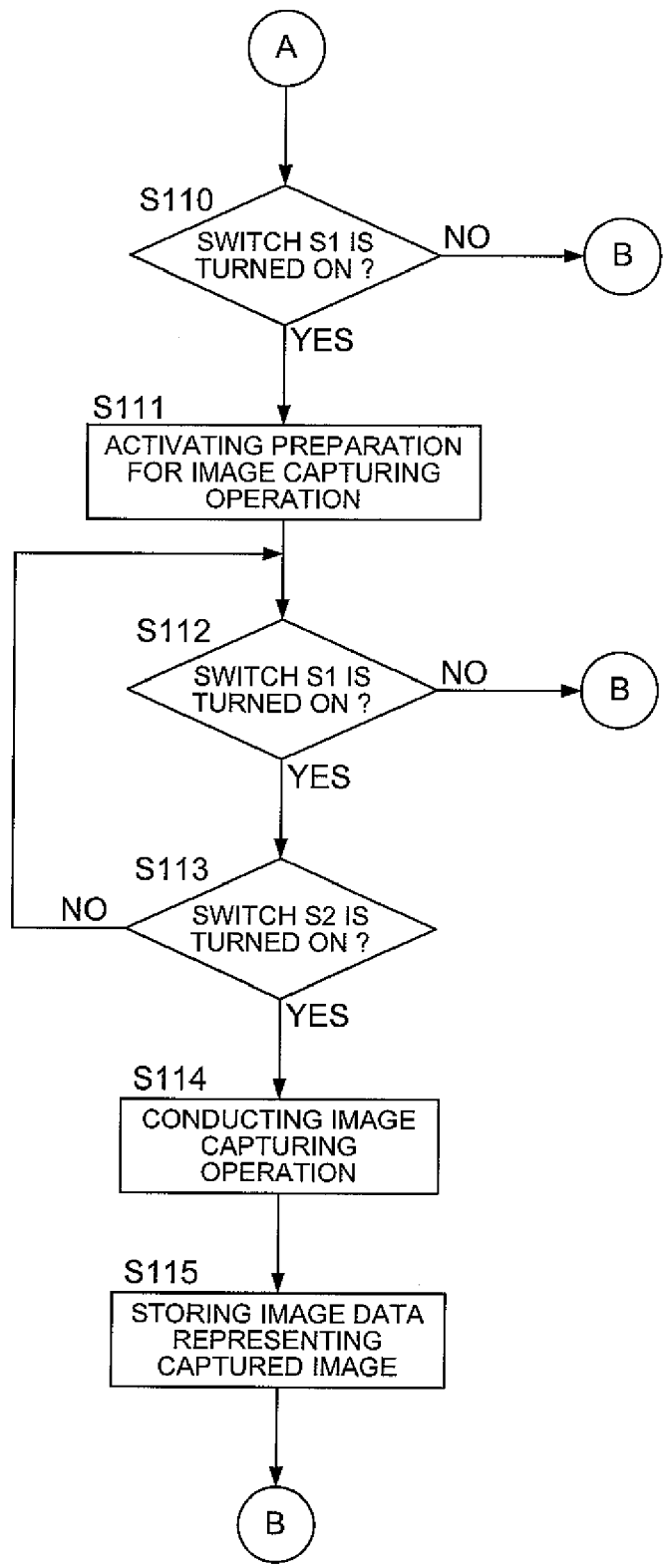
FIG. 7 shows another flowchart indicating essential operations to be conducted by an image capturing apparatus embodied in the present invention.

FIG. 6 and FIG. 7 show flowcharts indicating the essential operations to be conducted by the image capturing apparatus embodied in the present invention. According to the flowcharts, each of the processing steps will be detailed in the following.

Initially, in the flowchart shown in FIG. 6, when the main switch is turned ON (Step S101), the camera 100 determines whether or not an operating mode is currently set at an image capturing mode (Step S102). Since the camera 100 is provided with various kinds of operating modes, such as an image capturing mode, a playback mode, a setup mode, etc., when determining that the operating mode is not currently set at the image capturing mode (Step S102; No), the camera 100 enters into the other operating mode currently set (Step S201).

When determining that the operating mode is currently set at the image capturing mode (Step S102; Yes), the second lens group 2 is positioned at a predetermined wide position (Step S103). Concretely speaking, for instance, the second lens group 2 is driven to move from the position at which a light shading plate 2h, integrally formed on the second lens-group holding frame 2k, has withdrawn form the gap formed between the light emitting and receiving parts of the photo-interrupter 32, just for a number of steps, established in advance, by the stepping motor.

Successively, an operation for acquiring lens positioning data is performed (Step S104). In this connection, the operation for acquiring the lens positioning data will be further detailed in the following.

Figure 8:
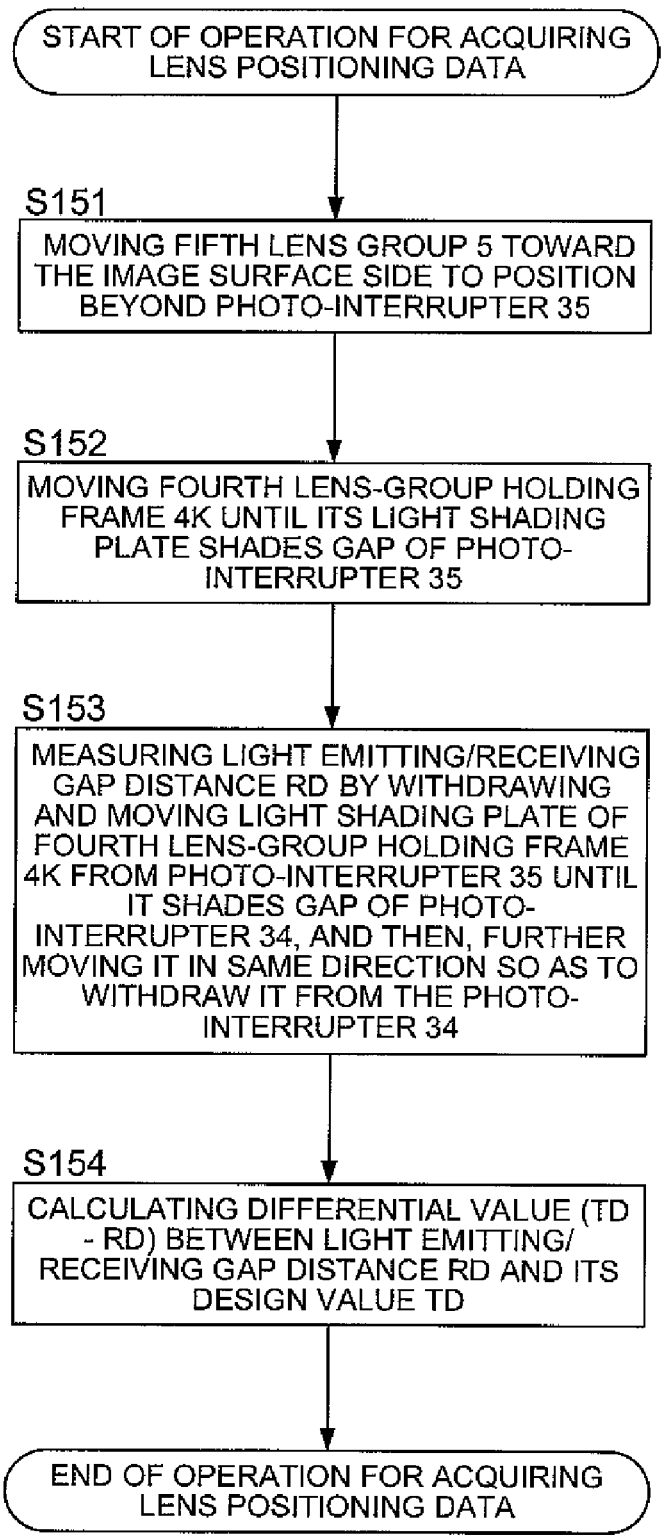
FIG. 8 shows an exemplary flowchart indicating an operation for acquiring lens positioning data, to be performed in Step S104 shown in FIG. 6.

FIG. 8 shows an exemplary flowchart indicating the operation for acquiring the lens positioning data, to be performed in Step S104 shown in FIG. 6. Further, FIG. 9(*a*), FIG. 9(*b*) and FIG. 9(*c*) show schematic diagrams indicating movements of the fourth lens group 4 and the fifth lens group 5 at the time of conducting the operation for acquiring the lens positioning data. In this connection, the schematic diagrams shown in FIG. 9(*a*), FIG. 9(*b*) and FIG. 9(*c*) correspond to Step S151, Step S152 and Step S153, shown in FIG. 8, respectively.

Figure 9:
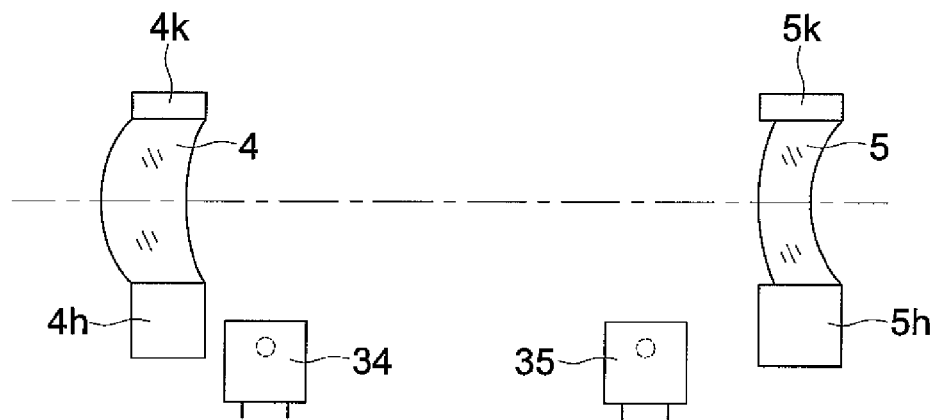
FIG. 9(a), FIG. 9(b) and FIG. 9(c) show schematic diagrams indicating movements of a fourth lens group and a fifth lens group at the time of conducting an operation for acquiring lens positioning data.
Figure 9:
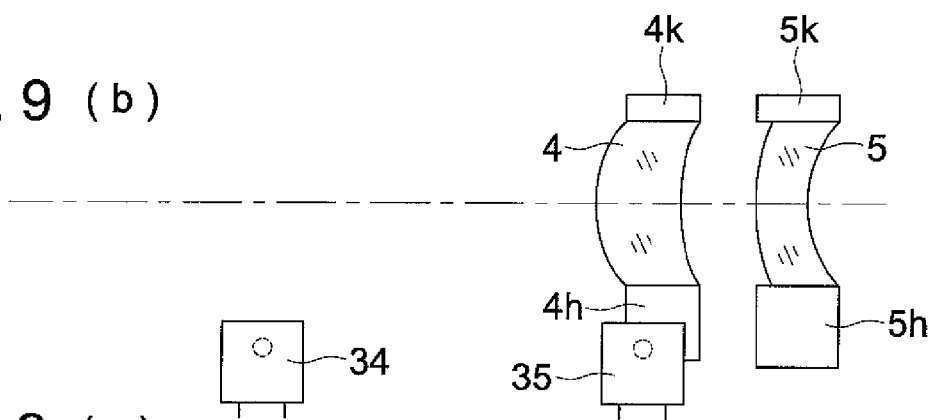
Figure 9:
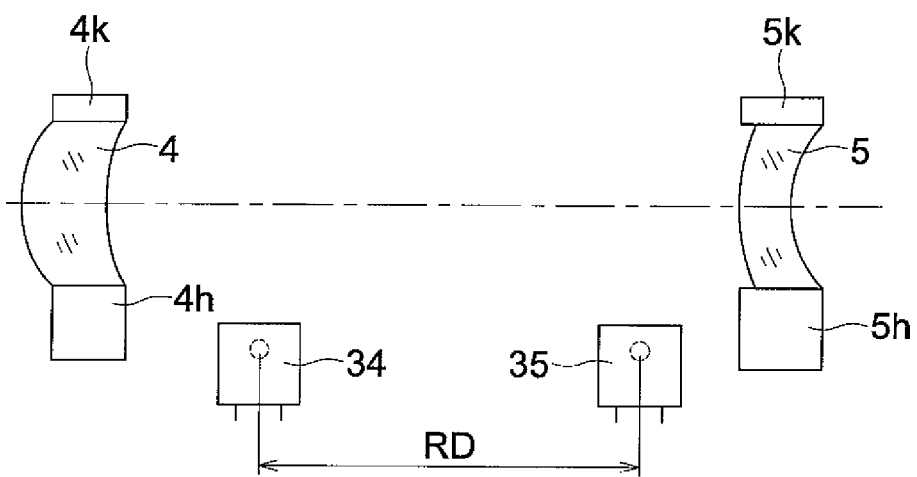

In the operation for acquiring the lens positioning data (Step S104 shown in FIG. 6), as indicated in the flowchart shown in FIG. 8, at first, the fifth lens group 5 is made to move toward the image surface side (sixth lens group side) to a position beyond the photo-interrupter 35 from the initial position indicated in the wide state shown in FIG. 4, as shown in FIG. 9(*a*) (Step S151).

Successively, as shown in FIG. 9(*b*), the fourth lens group 4 is made to move toward the image surface side until the light shading plate 4h formed on the fourth lens-group holding frame 4k shades the gap formed between the light emitting and receiving parts of the photo-interrupter 35 (Step S152). Then, as shown in FIG. 9(*c*), the fourth lens-group holding frame 4k is further made to move toward the third lens group 3 side, so as to derive a light emitting/receiving gap distance RD between the photo-interrupter 34 and the photo-interrupter 35 from data that represents the position at which the light shading plate 4h withdraws the gap formed between the light emitting and receiving parts of the photo-interrupter 35 and other data that represents the position at which the light shading plate 4h withdraws the gap formed between the light emitting and receiving parts of the photo-interrupter 34 after shading the gap concerned (Step S153). In this connection, the light emitting/receiving gap distance RD can be found from the number of steps driven by the stepping motor for moving the fourth lens-group holding frame 4k and a pitch of the lead screw.

Still successively, with respect to the light emitting/receiving gap distance RD between the photo-interrupter 34 and the photo-interrupter 35 and its design value TD, a differential value between them (TD−RD) is found (Step S154). Through the abovementioned procedure, the operation for acquiring the differential value (TD−RD), serving as the data for positioning the lens groups, is completed.

Still successively, returning to the flowchart shown in FIG. 6, the light shading plate 4h formed on the fourth lens-group holding frame 4k that holds the fourth lens group 4 is positioned and stopped at, for instance, the wide position established in advance, by referring the position at which the light shading plate 4h has withdrawn form the photo-interrupter 34 (Step S105).

Yet successively, the light shading plate 5h formed on the fifth lens-group holding frame 5k that holds the fifth lens group 5 is positioned and stopped at, for instance, the wide position, based on the position at which the light shading plate 5h has withdrawn the photo-interrupter 35 and the differential value (TD−RD) derived in the above (Step S106). The operation for positioning the fifth lens group 5 will be further detailed in the following.

Figure 10:
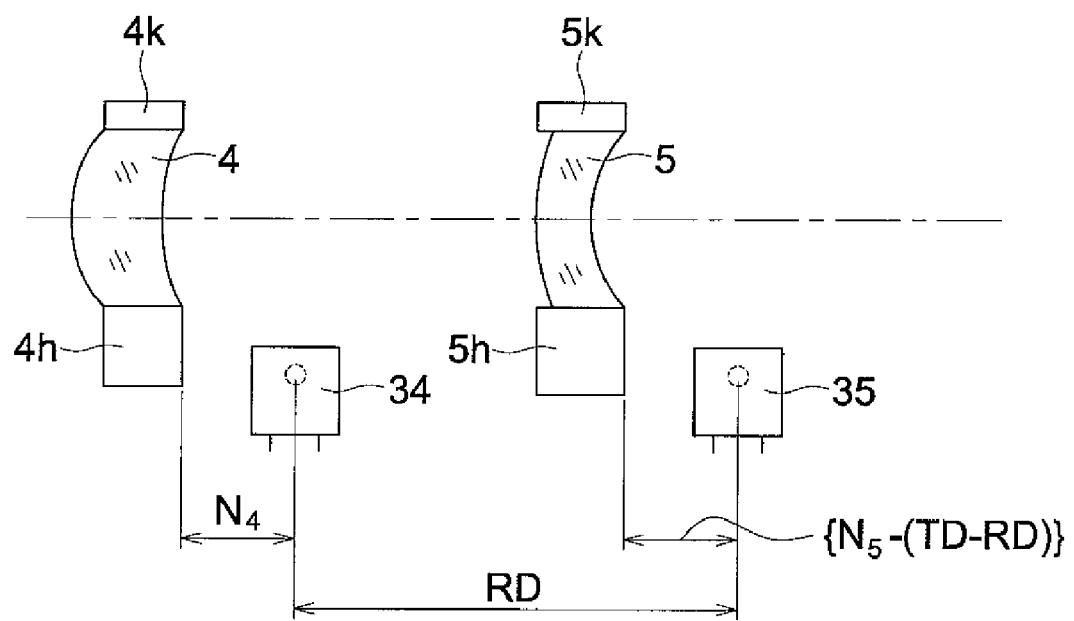
FIG. 10 shows a schematic diagram indicating a state that an operation for positioning a fourth lens group and a fifth lens group is completed.

FIG. 10 shows a schematic diagram indicating a state that the operation for positioning the fourth lens group 4 and the fifth lens group 5 is completed.

When Equation "TD=RD" is fulfilled, it is premised that the interval distance between the fourth lens group 4 and the fifth lens group 5 is accurately secured by moving the fourth lens-group holding frame 4k to a position being apart from the gap, formed between the light emitting and receiving parts of the photo-interrupter 34, by a predetermined distance N4, while, by moving the fifth lens-group holding frame 5k to a position being apart from the gap, formed between the light emitting and receiving parts of the photo-interrupter 35, by a predetermined distance N5.

As shown in FIG. 10, at first, the fourth lens-group holding frame 4k is made to move from the gap, formed between the light emitting and receiving parts of the photo-interrupter 34, to the position being apart from the concerned gap by the predetermined distance N4. On the other hand, the fifth lens-group holding frame 5k is made to move from the gap, formed between the light emitting and receiving parts of the photo-interrupter 35, to the position being apart from the concerned gap by the derived value of {N5−(TD−RD)}. According to the abovementioned, it becomes possible to set the interval distance between the fourth lens group 4 and the fifth lens group 5 at a constant value, even if at least one of the assembled positions of photo-interrupters 34, 35 shifts from the default position.

In this connection, as shown in FIG. 10, it is preferable that the moving direction in which the light shading plate 4h of the fourth lens-group holding frame 4k withdraws from the photo-interrupters 34 is the same as that in which the light shading plate 5h of the fifth lens-group holding frame 5k withdraws from the photo-interrupters 35. When the abovementioned condition is fulfilled, a backlash between the lead screw and the fitting member geared with the lead screw and a gap between the fitting member and the sleeve member can be shifted to the same direction. As a result, it becomes possible to eliminate error factors.

As a result of conducting the above operations, the wide positions of the second lens group 2, the fourth lens group 4 and the fifth lens group 5 are determined at the time when the zooming position is set at the Wide position (W), respectively. Specifically, by positioning the fifth lens group 5 on the basis of the differential value, serving as the lens positioning data, and the detecting results of the photo-interrupter 35, it becomes possible to accurately set the interval distance between the fourth lens group 4 and the fifth lens group 5, even if the interval distance between the two photo-interrupters includes some error.

After the abovementioned operations are completed, returning to the flowchart shown in FIG. 6, the camera 100 again determines whether or not the main switch is turned ON (Step S107). When determining that the main switch is not turned ON (Step S107; No), the camera 100 finalizes the operation (END).

When determining that the main switch is turned ON (Step S107; Yes), the camera 100 further determines whether or not the zooming button is currently operated (Step S108). When determining that the zooming button is currently operated (Step S108; Yes), the camera 100 performs the variable power actions according to the user's actions for operating the zooming button (Step S109). Concretely speaking, the second lens group 2, the fourth lens group 4 and the fifth lens group 5 are made to move according to the moving lines indicated in the moving line chart shown in FIG. 3(b).

When determining that the zooming button is not currently operated (Step S108; No), shifting to the flowchart shown in FIG. 7, the camera 100 further determines whether or not a switch S1 is turned ON (whether or not the release button 56 is depressed up to the initial stage of its depression) (Step S110). When determining that the switch S1 is not turned ON (the release button 56 is not depressed up to the initial stage of its depression) (Step S110; No), the camera 100 returns to Step S107.

When determining that the switch S1 is turned ON (the release button 56 is depressed up to the initial stage of its depression) (Step S110; Yes), the camera 100 activates the actions for preparing the image capturing operation, such as the focusing action, the photometry action, etc., (Step S111). After that, the camera 100 again determines whether or not the switch S1 is turned ON (Step S112). When determining that the switch S1 is not turned ON (Step S112; No), the camera 100 returns to Step S107. When determining that the switch S1 is turned ON (Step S112; Yes), the camera 100 further determines whether or not a switch S2 is turned ON (the release button 56 is depressed up to a secondary stage of its depression) (Step S113). When determining that the switch S2 is not turned ON (the release button 56 is not depressed up to the secondary stage of its depression) (Step S113; No), the camera 100 returns to Step S112.

When determining that the switch S2 is turned ON (the release button 56 is depressed up to the secondary stage of its depression) (Step S113; Yes), the camera 100 conducts the image capturing operation (Step S114), so as to stored image data representing a captured image into the card-type image data storage 54 (Step S115). Then, finalizing the image capturing operation for one scene, the camera 100 returns to Step S107.

Described in the foregoing are the essential operations to be conducted by the image capturing apparatus embodied in the present invention.

In this connection, it is needless to say that the camera 100, serving as an image capturing apparatus embodied in the present invention, is provided with a control section (not shown in the drawings) that totally controls various kinds of sections included in the camera 100, and all of the aforementioned essential operations are performed under the control processing actions to be conducted by the control section.

Further, in the preferred embodiment described in the foregoing, the operation for acquiring the lens positioning data is performed at the time when the main switch of the image capturing apparatus is turned ON and the image capturing apparatus currently enters in the image capturing mode. However, the scope of such the timing is not limited to the abovementioned, but it is also applicable that the above operation is performed at the time when a battery is loaded into the image capturing apparatus. Further, it is also applicable that the image capturing apparatus is provided with a temperature detecting section either inside or in the vicinity of the lens unit, so as to perform the above operation at the time when the detected temperature exceeds a predetermined temperature range. According to such the configuration, it becomes possible to eliminate such the positioning errors that are caused by shrinkage of the main barrel, etc., due to the temperature changes, as well. Still further, it is also applicable that the image capturing apparatus is so constituted that default lens positioning data, which had been acquired in the factory by conducting the data acquiring process before shipping the image capturing apparatus, has stored in a certain storage, such as the $E^2PROM$, the ROM, etc., provided in the image capturing apparatus concerned, so that the default lens positioning data can be used for the image capturing operation by reading out the concerned data form the storage at the time when the main switch of the image capturing apparatus is turned ON and the image capturing apparatus currently enters in the image capturing mode.

Still further, in order to acquire the default lens positioning data, it is applicable that a driving circuit is coupled to the lens unit before assembling it into the image capturing apparatus, so as to make the lens unit perform the operations indicated in the flowchart shown in FIG. 8.

By configuring the image capturing apparatus in the manner as aforementioned, it becomes possible to accurately set an interval distance between specific lens groups included in the image-capturing optical system, even if the interval distance between the specific lens groups concerned has a high error sensitivity with respect to a specific factor, such as a curvature of field, a spherical aberration, a back focal distance, etc., and accordingly, it becomes possible to secure a stable efficiency of the image forming apparatus concerned.

According to the present invention, it becomes possible to provide a lens-group positioning method and an image capturing apparatus, each of which makes it possible to accurately secure the distance between the two lens groups, so as to produce a high quality image.

While the preferred embodiments of the present invention have been described using specific term, such description is for illustrative purpose only, and it is to be understood that changes and variations may be made without departing from the spirit and scope of the appended claims.

What is claimed is:

1. A lens-group positioning method to be employed for positioning a first lens group and a second lens group, both of which are included in an optical system that further includes a first detecting section to detect a first reference position for moving the first lens group, and a second detecting section to detect a second reference position for moving the second lens group, the lens-group positioning method comprising:

moving any one of the first lens group and the second lens group, so as to find a real distance between the first detecting section and the second detecting section;

finding a differential value between the real distance and a default design-distance between the first detecting section and the second detecting section;

positioning the first lens group based on a first detected result, which is detected by the first detecting section; and positioning the second lens group based on the differential value and a second detected result, which is detected by the second detecting section.

2. The lens-group positioning method of claim 1,
wherein the first lens group and the second lens group are arranged in the optical system in such a manner that the first lens group and the second lens group are respectively movable in a direction of a common optical axis.

3. The lens-group positioning method of claim 2,
wherein the optical system is a bended optical system in which the common optical axis is bended at substantially a right angle.

4. An image capturing apparatus, comprising:
a lens unit that includes a first lens group, a second lens group, a first driving section to drive the first lens group, a second driving section to drive the second lens group, a first detecting section to detect a first reference position for moving the first lens group, and a second detecting section to detect a second reference position for moving the second lens group; and
a control section to control the first driving section and the second driving section so as to move the first lens group and the second lens group, respectively;
wherein the control section controls either the first driving section or the second driving section so as to move a corresponding one of the first lens group and the second lens group between the first detecting section and the second detecting section at a predetermined timing and,
wherein, after the corresponding one of the first lens group and the second lens group is made to move between the first detecting section and the second detecting section, the control section controls the first driving section and the second driving section so as to move the first lens group and the second lens group based on the first reference position detected by the first detecting section, and the second reference position detected by the second detecting section, respectively.

5. The image capturing apparatus of claim 4,
wherein the first lens group and the second lens group are mounted inside the lens unit in such a manner that the first lens group and the second lens group are respectively movable in a direction of a common optical axis.

6. The image capturing apparatus of claim 5,
wherein a bended optical system, which includes the first lens group and the second lens group and in which the common optical axis is bended at substantially a right angle, is installed in the lens unit.

* * * * *